US011525795B2

(12) United States Patent
Schneider et al.

(10) Patent No.: US 11,525,795 B2
(45) Date of Patent: *Dec. 13, 2022

(54) ONLINE SURFACE RESISTANCE MEASURING OF PRIMED SUBSTRATES TO EVALUATE DRYING STATE

(71) Applicant: HP INDIGO B.V., Amstelveen (NL)

(72) Inventors: Matan Schneider, Ness Ziona (IL); Eli Shoshani, Ness Ziona (IL); Fernanda Orlik, Ness Ziona (IL)

(73) Assignee: HP Indigo B.V., Amstelveen (NL)

(*) Notice: Subject to any disclaimer, the term of this patent is extended or adjusted under 35 U.S.C. 154(b) by 51 days.

This patent is subject to a terminal disclaimer.

(21) Appl. No.: 16/951,159

(22) Filed: Nov. 18, 2020

(65) Prior Publication Data

US 2021/0072174 A1 Mar. 11, 2021

Related U.S. Application Data

(63) Continuation of application No. 16/097,059, filed as application No. PCT/EP2016/068708 on Aug. 4, 2016, now Pat. No. 10,876,984.

(51) Int. Cl.
G01N 27/04 (2006.01)
G03G 15/00 (2006.01)
G03G 15/10 (2006.01)

(52) U.S. Cl.
CPC ....... *G01N 27/048* (2013.01); *G03G 15/6558* (2013.01); *G03G 15/6588* (2013.01);
(Continued)

(58) Field of Classification Search
CPC ............. G01N 27/048; G03G 15/6558; G03G 15/6588
See application file for complete search history.

(56) References Cited

U.S. PATENT DOCUMENTS 2,197,823 A 4/1940 Harold
3,384,815 A 5/1968 Lyall
(Continued)

FOREIGN PATENT DOCUMENTS

CN 101085568 12/2007
CN 102112831 6/2011
(Continued)

OTHER PUBLICATIONS

Sugimoto; "Detection of Paint Curing by Non Contact Surface Resistivity Measurement"; In Proc. Joint Conf. Electrostat; 2012.

*Primary Examiner* — Alvaro E Fortich

(57) ABSTRACT

Apparatus and methods are provided for measuring the dryness of primer on a substrate in an inline priming system. In implementations, the apparatus comprises a plurality of measurement electrodes spaced laterally to extend across and contact a primed surface of a substrate following application of a primer to the substrate as it is fed through the inline priming system. A resistance measurement unit is provided as part of the dryness measuring apparatus to, in use, measure the surface resistance of the primed substrate between different measurement electrodes across the primed surface of a substrate. A controller is provided in the dryness measurement apparatus, the controller arranged to, in use: receive the measured surface resistance value and to generate, based on the measured surface resistance values, a dryness profile indicative of the dryness of the primer at locations across the substrate in the direction of the spacing of the electrodes.

20 Claims, 12 Drawing Sheets

(52) U.S. Cl.
CPC ......... *G03G 15/10* (2013.01); *G03G 15/5025* (2013.01); *G03G 2215/00763* (2013.01); *G03G 2215/00776* (2013.01); *G03G 2215/00801* (2013.01)

(56) References Cited

U.S. PATENT DOCUMENTS

| | | | |
|---|---|---|---|
| 3,713,966 A | 1/1973 | Lippke | |
| 5,602,486 A | 2/1997 | Novak | |
| 5,937,761 A | 8/1999 | Buschmann | |
| 6,974,035 B2 | 12/2005 | Dai et al. | |
| 2001/0019813 A1 | 9/2001 | Eichorst | |
| 2006/0250434 A1* | 11/2006 | Smith | B41J 11/00222 347/17 |
| 2008/0252680 A1* | 10/2008 | Schmid | G03G 15/1695 524/394 |
| 2011/0185804 A1* | 8/2011 | Sprycha | G01N 33/32 73/150 R |
| 2012/0051759 A1* | 3/2012 | Rimai | G03G 15/0851 399/27 |
| 2013/0077999 A1* | 3/2013 | Tombs | G03G 15/6585 399/130 |
| 2014/0015878 A1* | 1/2014 | Marcus | B41J 2/18 347/54 |
| 2014/0015879 A1* | 1/2014 | Marcus | B41J 2/105 347/9 |
| 2016/0221680 A1 | 8/2016 | Burton | |

FOREIGN PATENT DOCUMENTS

| | | |
|---|---|---|
| CN | 203101987 U | 7/2013 |
| JP | 10026644 | 1/1998 |
| JP | 2002162835 | 6/2002 |
| JP | 2003130901 | 5/2003 |

* cited by examiner

ONLINE SURFACE RESISTANCE MEASURING OF PRIMED SUBSTRATES TO EVALUATE DRYING STATE

BACKGROUND

High quality and high production rate printing of images onto substrates can be achieved using digital printing presses that deposit printing liquids such as electroinks or liquid toner-based inks onto the substrate using a print engine. One example of a printing technology that uses printing liquids rather than dry printing material is liquid elecrophotographic printing, which uses electrically charged printing particles suspended in a wetting agent. On certain substrates, such as certain papers, plastics and films, the printing liquids from the digital printing press may adhere better if the substrate is first coated with a layer of a digital printing primer substance.

Therefore in certain printing systems such as digital printing presses, an inline priming system may be provided to optionally coat the substrate with a layer of primer inline, in a process stage prior to or during the substrate being printed on with printing liquid in the print engine (rather than offline involving pre-prepared substrates). In the coating/printing process a drying phase of the primer may be provided for, as the drying condition of primer can affect directly the ability of the printing liquid to transfer to the substrate and thus may affect the print quality.

BRIEF DESCRIPTION OF THE DRAWINGS

Various examples are described herein with reference to the accompanying drawings, in which.

DETAILED DESCRIPTION

Figure 1:
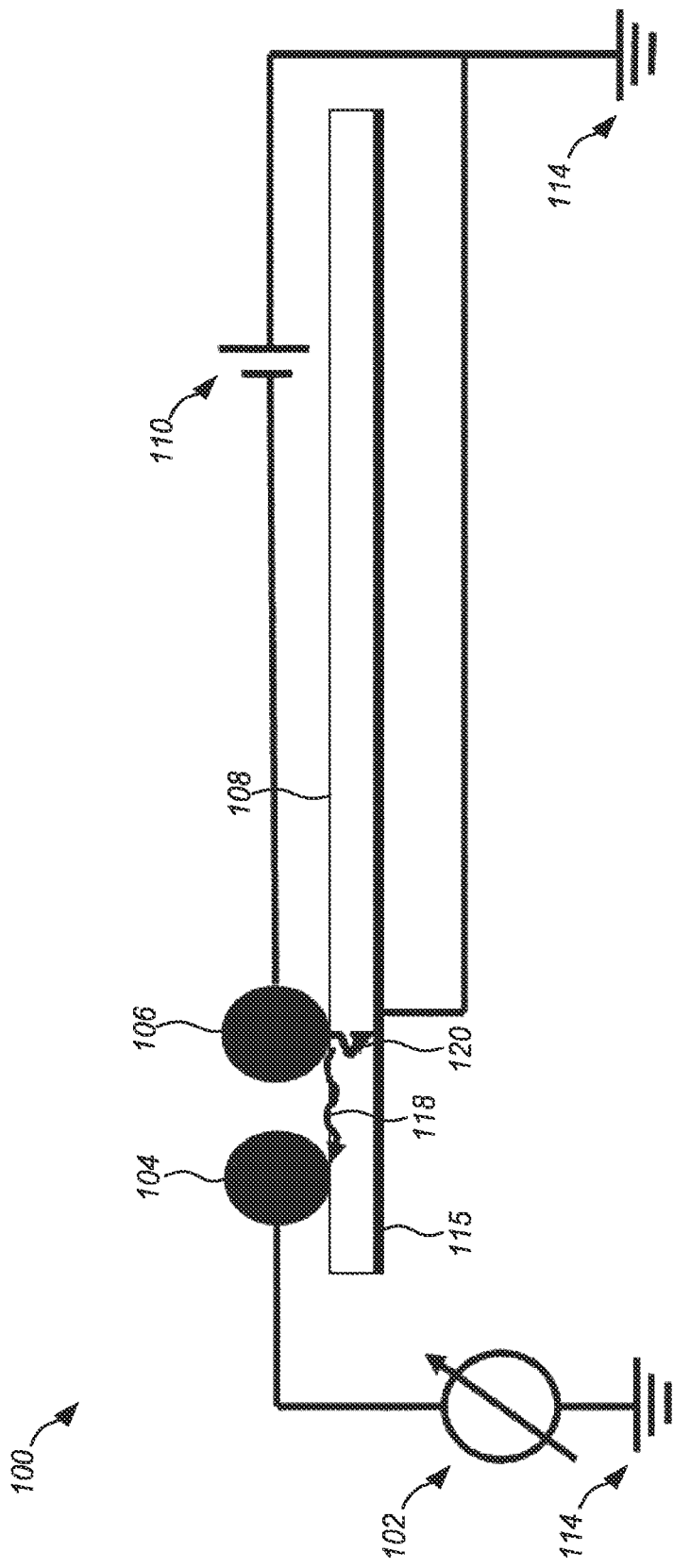
FIG. 1 shows an example of a circuit for measuring the resistance/dryness of a substrate for use in an inline priming system.

The disclosure provides example apparatuses and methods for an inline priming system of a digital press or printer with continuous (or temporally discrete) evaluation of the dryness of a coat of primer or another printing liquid on the surface of a printing substrate. The priming system is "inline" in the sense that it may form an integral part of a continuous sequence of print system operations such as priming, primer drying, dryness measurement and printing, although at least some of these operations may be performed in parallel. Measurement of the primer dryness in the inline priming system may be performed during a drying operation and prior to a digital printing operation, with feedback from dryness measurements made at different times and/or in different surface positions or surface areas of the substrate being provided to a drying system unit to improve the efficiency and/or effectiveness of the drying process.

Examples of primers include solvent-based primer agents. Water is one example of solvent that may be used in the primer. Example apparatuses, methods and machine-readable instructions are provided to measure and evaluate a dryness of a primer coat on a printing substrate. In some example implementations, an indication of dryness of a primed substrate is expressed as a dryness profile or dryness metric that is indicative of how the primer dryness varies at different spatial locations or extended areas across the surface of the primed substrate. The extended area may be a strip across the primed substrate surface in a print direction, where the print direction can be defined by a direction of motion of the substrate through a print system comprising the inline priming system followed by a print engine. The inline priming system may be used together with a print engine as part of an overall print system (see FIG. 8). The inline priming system may comprise an inline primer, a drying system and a dryness measurement unit.

Example apparatuses, methods and machine-readable instructions provide feedback, such as the dryness profile, to a controller of the primer drying system to help ensure that the primer is sufficiently dry before the digital print engine prints on the primed substrate. The controller may comprise general purpose or special purpose processing circuitry. The dryness profile may be provided to an operating system installed on the controller to enable a drying process to be adapted based on it. In various examples, electrical measurements (e.g. voltage, current, resistance) may be performed to provide an indirect indication of a solvent content of a primer layer on the substrate at the time(s) of measurement. Since a proportion of moisture (water or another solvent) is removed from the primer layer as the primer dries, the electrical measurements provide an evaluation of the primer dryness. Drying the primer layer on a substrate may be assisted by, for example, applying heat and/or a controlled air flow and is a mass transfer process comprising of the removal of water or other solvent from the primer layer by evaporation. The primer layer may be a solid, semi-solid or liquid, depending upon a dryness level. In the examples, a loss of moisture in solvent-based primers as drying progresses can be translated to measured changes in electrical resistance and/or conductivity parameters.

Figure 8:
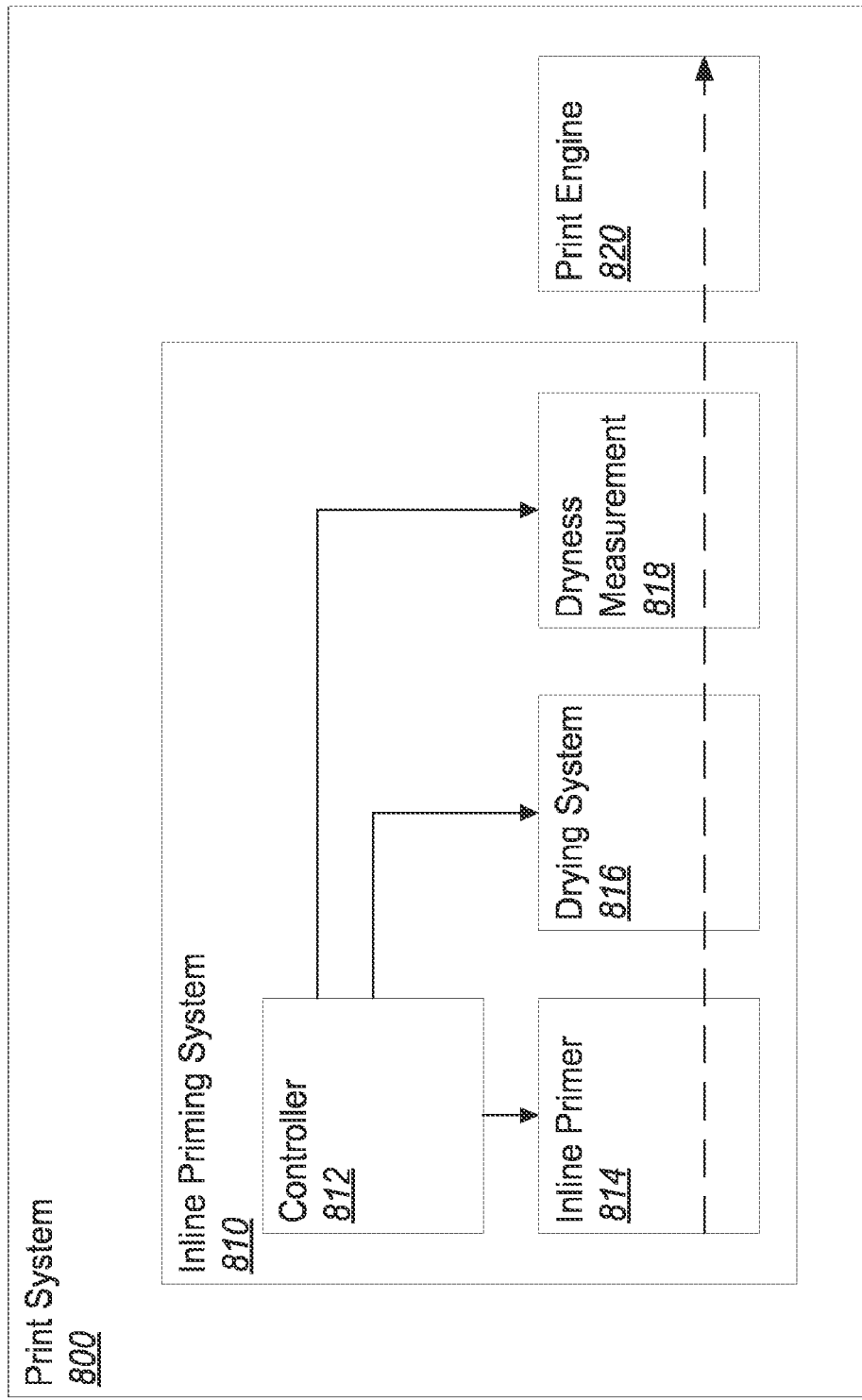
FIG. 8 schematically illustrates a print system having an inline priming system incorporating a dryness measurement unit including any one of the example dryness/resistance measurement circuits of FIG. 1 to FIG. 3B.

FIG. 1 schematically illustrates an example apparatus for measuring the dryness of a primer on a substrate in an inline priming system of the overall print system of FIG. 8. The apparatus includes a circuit 100 for measuring the resistance of a primed substrate. The circuit 100 may correspond to the dryness measurement unit 818 of the FIG. 8 example print system. The circuit 100 comprises: a resistance measurement unit 102, a first electrode 104, a second electrode 106, a primed substrate 108, a power supply 110, a ground 114 and a ground electrode 115, which has a connection to the ground 114. The primed substrate 108 in this example is a planar sheet having a finite thickness and a length of the sheet extends along a priming and printing direction. Also illustrated in FIG. 1 is a first charge flow path 118 flowing across the surface of the primed substrate 108 and a second charge flow path 120 flowing through the material of the substrate 108 from the second electrode 106 to the ground electrode 115 located on an opposite surface of the primed substrate 108 relative to a surface with which the second electrode 106 is in contact (i.e. through the thickness of the primed substrate 108 from top to bottom as illustrated in FIG. 1). Thus the second charge flow path 120 flows through the bulk of the primed substrate 108 whilst the first charge flow path 118 flows across the surface of the primed substrate 108.

The substrate forming part of the primed substrate 108 may be any material, for example, but not limited to, paper, card, plastics, metals, alloys, polymers and the like. In FIG. 1 a primer layer on the surface of the primed substrate 108 is not visually distinguishable from the substrate itself as illustrated. Primer is applied to a substrate to provide a surface which can be subsequently printed upon by a printing system or print engine. Various different substrates may be more or less compatible with a particular printing process. As explained above, the primer may be applied in an inline priming system (see 810 in FIG. 8) which may be provided inline in, collocated with, or integrated with a printing system (see 800 in FIG. 0.8) or print engine (see 820 in FIG. 8).

After a primer is applied to a substrate, the primed substrate 108 can be sufficiently dried before being printed on. If the primer is not dry enough, it may leave unwanted residue on any components it interfaces with during the print process and excess primer moisture may prevent printing liquid from being successfully applied to the primer surface.

Primer may have a high solvent content, and during the drying process following application of the primer to the substrate, the solvent evaporates from the primer. The primer may be left to dry in an environment at room temperature, or the process may be shortened by, for example, blowing hot air over the primer, for example in the inline priming system 810 of FIG. 8. For example, the inline priming system 810 may have one or more hardware and/or software components that together actively control the environment to which the primed substrate is exposed to effect the drying of the primer. These components may together be considered to provide a drying management system or subsystem of the print system or inline priming system.

The dryness of the primer applied to a substrate is proportional to the solvent, (e.g., moisture) content of the primer. Furthermore, due to the moisture content of the primer, the primer has an inherent electrical conductance. Conductance is inversely proportional to resistance, and, as such, the resistance provided by the surface of the primed substrate 108 is generally inversely proportional to the remaining moisture content (wetness) of the primer. Conversely, the resistance of the primer is generally proportional to the dryness of the primer, such that resistance of the primer layer increases as the primed substrate becomes progressively dryer.

To be sure that the measured resistance is associated with the resistance due to the primer itself, and not the electrical resistance associated with the underlying substrate, the example dryness measurement apparatus may be arranged to generally measure the surface resistance of the primer as applied to the substrate in a two-dimensional plane along the primed surface of the substrate 108. Therefore, in the example inline priming system circuit 100 of FIG. 1, the resistance measured is indicative of the current flow along a plane of the primed surface of the substrate as in the first electron flow path 118. The resistance effects of the substrate on the electron/current flow perpendicular to the plane of the primed surface or through the material bulk of the substrate (e.g. the second current flow path 120) may be discounted from the measured resistance signal.

As shown in FIG. 1, the surface resistance of the substrate 108 may be measured by placing the first and second electrodes 104, 106 on the surface of the primed substrate 108 spaced apart from one another, such that the respective electrodes do not make direct electrical contact with each other. The electrodes may be spaced apart from each other, for example, such that they span at least a portion of a width of the substrate 108, where the length is along the direction of movement through the inline primer, which may be coincident with a direction of movement through the print engine. Despite the electrodes being spaced apart from each other, electrons can flow via the first charge flow path 118 from the first electrode 106 to the second electrode 10 by completing a circuit via a surface of the primed substrate 108. Note that conventional current flows in an opposite direction from the flow of electrons (i.e. from positive towards negative battery terminal) The first and second electrodes 104, 106 are arranged in use to contact the primed surface of the primed substrate 108 (top surface as illustrated) at respective different surface positions. The first electrode 104 is coupled to the resistance measurement unit 102, which in turn is coupled to the ground 114. The resistance measurement unit 102 may be arranged to output a signal indicative of a level of resistance to the current flow in the first charge flow path 118 between the first electrode 104 and the second electrode 106. The second electrode 106 is coupled to the power supply 110 which in turn is coupled to the ground 114.

As indicated above, to avoid or at least reduce the impact of the resistance effects of the bulk of the substrate on the current flow between the electrodes 104, 106, the ground electrode 115 is arranged to contact a surface of the primed substrate 108 (the undersurface as illustrated) at least in an area opposite one or both electrodes 104, 106. Thus measurement of any resistance effects on the current flowing through the substrate (e.g. perpendicular to the plane of the substrate along the second charge flow path 120) can be avoided, because the ground electrode 115 conducts any current flowing through the substrate as shown in the second charge flow path to ground 114, such that the current through the substrate bypasses the resistance measurement unit 102. This means that current flowing across the surface of the substrate along the first charge flow path 118 has an influence on measurements made by the resistance measurement unit 102, whereas current flowing via the second charge flow path 120 does not.

The power supply 110 acts as a current source, and a current flows via the first charge flow path 118, with electrons flowing from the second electrode 106 to the first electrode 104 across the surface of the primed substrate 108. The resistance measurement unit 102 measures a quantity indicative of the surface resistance across the two electrodes. The current flowing between the second 106 and first 104 electrodes will vary dependent on the conductivity of the primed substrate 108 between the two electrodes, which in turn depends upon the conductivity, and hence the remaining solvent content of the drying primer layer. The surface resistance may alternatively be measured by placing an ohmmeter (not shown) across the electrodes or an ammeter coupled to the first electrode 104 to measure the current flow (e.g. in Amps) between the first electrode 104 and the ground 114. Any other kind of suitable measurement unit indicative of surface resistance may be used.

An example apparatus is provided for measuring the dryness of primer on a substrate in an inline priming system. In some implementations, the apparatus comprises a plurality of measurement electrodes spaced laterally to extend across and contact, during measurement, a primed surface of a substrate following application of the primer to the substrate as it is fed through the inline priming system. The example apparatus comprises a resistance measurement unit to, in use measure the surface resistance of the primed substrate between differing (different) measurement electrodes across the primed surface of a substrate. The measurement electrodes may be the same in physical form but may differ in respective spatial positions on the surface of the primed substrate 108 at which they are arranged to make measurements. Alternatively, respective electrodes may differ from each other both in physical form and in spatial position. The example apparatus comprises a controller to, in use receive the measured surface resistance values; and generate, based on the measured surface resistance values, a dryness profile indicative of the dryness of the primer at locations across the substrate in the direction of the spacing of the electrodes. The example may further comprise, where the measurement electrodes and/or ground electrodes comprise cylindrical or ring-like rollers to engage the surface of the substrate in use. The example may have on one or more measurement electrodes each further comprising a contact rod engaged with the surface of the roller, the contact rods being shaped to scrape primer residue from the roller in use.

An example method is provided to measure the dryness of primer on a substrate in an inline priming system. In some implementations, the example method comprises using a plurality of measurement electrodes spaced laterally to extend across and contact a primed surface of a substrate following application of a primer to the substrate as it is fed through the inline priming system. The surface resistance of the primed substrate is measured between different (differing) measurement electrodes across the primed surface of the substrate, generating a dryness profile indicative of the dryness of the primer across the substrate in the direction of the spacing of the electrodes. The example may have the measurement electrodes arranged laterally across the width of the substrate so that they are perpendicular or substantially perpendicular to the direction of movement of the substrate. In other examples the electrode arrangement may move along the length of the substrate, spanning a least a portion of the substrate width. The example may also comprise determining moisture values based on the measured surface resistance value.

Figure 2A:
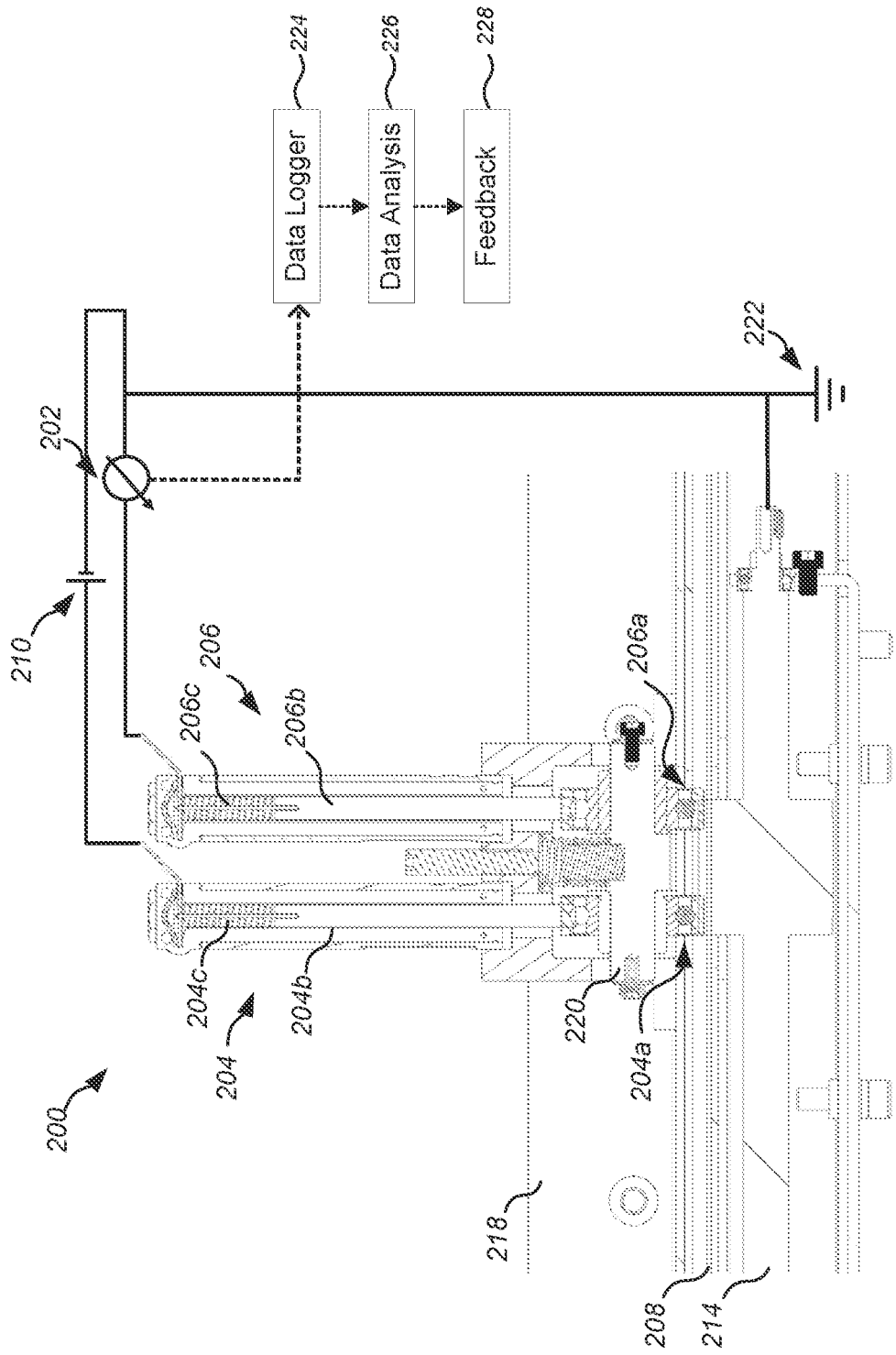
FIG. 2A shows a detail cutaway view of the dryness measuring circuit of FIG. 1, but showing an example single measurement electrode-pair arrangement and grounding electrode arrangement in more detail.

FIG. 2A shows a cutaway view of the circuit 100 of FIG. 1, showing the measurement electrodes and the ground electrode(s) in more detail. The dryness measurement circuit 200 comprises: a resistance measurement unit 202; a first measurement electrode 204, having a first roller bearing 204a, a first spring loaded contact rod 204b and a first spring 204c; a second measurement electrode 206, having a second roller bearing 206a, a second spring loaded contact rod 206b and a second spring 206c; a primed substrate 208 lying in a plane between the roller bearings 204a, 206a above and a ground electrode 214 beneath; a power source 210; a lateral support member 218 which may extend laterally across the plane of the primed substrate 208 in a direction perpendicular to a direction of transit of the primed substrate 208 through the dryness measurement system and arranged to support an assembly comprising the first and second electrodes 204, 206; and a spindle 220 arranged to support the electrode roller bearings 204a, 206a. The electrode roller bearings 204a, 206a are shown in cross section in FIG. 2A, but form cylinders or rings mounted on the spindle 220. The electrode roller bearings 204a, 206a are the parts of the electrodes 204, 206 which contact the primed substrate in use to perform resistance measurements. The other electrode parts provide electrical connection to the power source 110 and the resistance measurement unit 202. Measurement data output by the resistance measurement unit 202 is supplied to a data logger 224, a data analysis unit 226 and a feedback unit 228.

The example dryness measurement circuit 200 of FIG. 2A gives a dryness indication for the primed substrate 208 for a localised position on the substrate in the region (area) between the measurement electrodes 204, 206. Furthermore, as the measurement electrodes 204, 206 move relative to the primed substrate, a dryness indication may be provided for a strip on the surface of the primed substrate 208 along the trajectory swept out by the electrode pair. A plurality comprising two or more measurement electrodes can be provided to provide a dryness profile across the surface of the primed substrate 208, with different areas between respective spaced apart electrodes being measured as the primed substrate 208 moves relative to the electrode bearings 204a, 206a The primed substrate 208 may have a primer applied to the upward-facing surface of the substrate 208 by an inline priming system of a digital press (see FIG. 8).

A surface resistance of the primed substrate 208 may be measured in the circuit 200 by the two measurement electrodes 204, 206 arranged generally side-by-side (or laterally) as they pass across the substrate (in use) and perpendicular to the direction of passage of the substrate through the inline priming system on to the digital press. In some examples the electrodes may be spaced laterally, perpendicular to an axis of movement of the primed substrate through the inline priming system, but different ones of the plurality of electrodes may be located on different axes. The lateral spacing between measurement electrodes allows instantaneous surface resistance measurements to be made along a line separating the electrodes or within a two-dimensional surface area as the electrodes move relative to the primed substrate 208.

The electrode roller bearings 204a, 206a of the measurement electrodes 204, 206 are arranged to physically and electrically contact on the primed surface of the primed substrate 208. The electrodes 204, 206 may be spaced longitudinally apart from one another, such that, for example, the longitudinal axes though respective electrodes 204, 206 (such as longitudinal axes through spring loaded contact rods 204b, 206b) are parallel and extend perpendicularly or approximately perpendicularly to the primed surface. The contacting portions of the measurement electrodes 204, 206 are the roller bearings 204a, 206a. These roller bearings 204a, 206a are arranged to rotate as the substrate passes through (e.g. beneath) them and may be cylindrical or ring-like in form, with the curved wall of the cylinder rotating across the primed layer of the primed substrate 208. The roller bearings 204a, 206a may be hollow cylinders (ring-like), mounted on and spaced apart along the spindle 220, with the spindle forming a longitudinal axis through the open ends of the hollow cylinders.

The ground electrode 214 may also be formed as a cylinder (hollow or solid) and is arranged in opposition to the measurement electrodes 204, 206 to act to lightly nip (physically and electrically contact) the primed substrate 218 as it passes between the roller bearings 204a, 206a of the measurement electrodes 204, 206 and the ground electrode 214. The measurement electrodes 204, 206 may be affixed in a housing and supported by the lateral support member 218 which extends across an upper part of a drying bed (not shown). The drying bed supports the substrate following application of the primer and whilst the primed substrate is subjected to drying by a drying system 816 (see FIG. 8) of the inline priming system by, for example, the selectively directed blowing of heated air across at least some locations (areas) on the primed substrate. The heating, air flow rate and directing of the air may be controlled by the controller 812 (see FIG. 8), using machine-readable program instructions. To allow the primed substrate 208 to pass smoothly through the nip (gap or space) between the measurement electrodes 204, 206 and the ground electrode 214 without smudging the primer layer, the surface contact portions of the measurement electrodes 204, 206 may be formed as bearings such as the roller bearings 204a, 206a supported by the spindle 220, which are arranged to freely roll as the substrate 208 passes underneath. The roller bearings 204a, 206a are arranged to roll in the direction of travel of the substrate 208 as it passes through the inline priming system to allow the substrate to continue in its processing towards the print engine.

Electrical contact between the roller bearings 204a, 206a and the primed substrate 208 may be achieved by the spring loaded contact rods 204b, 206b, which can be urged by the electrode springs 204c, 206c to contact against respective rolling surfaces of the roller bearings 204a, 206a. This presses the roller bearings 204a, 206a against the primed surface 208 with a contact force depending upon resilient deformation of the springs 204c, 206c. Similarly, to allow rotation of the ground electrode 214 as the substrate 208 passes over the curved wall of the cylindrical surface of the ground electrode 214, the ground electrode 214 may also be arranged on or supported on a spindle supported by bearings (not shown). The contact rods 204b, 206b may be shaped to scrape primer residue from the respective roller bearings 204a, 206a in use, to prevent or at least reduce the likelihood of primer residue from having an effect upon (changing) the measured resistance characteristic. The roller bearings 204a, 206a may, for example, be stainless steel roller bearings. The contact rods 204b, 206b may, for example, be formed of graphite.

Similarly to the circuit arrangement 100 described in relation to FIG. 1, in the dryness measurement circuit 200 of FIG. 2A, a positive terminal of the power source 210 is coupled to the first measurement electrode 204. The second measurement electrode 206 is connected through the resistance measurement unit 202 to give a signal indicative of surface resistance of the primed substrate 208. A negative terminal of the power source 210 is also connected to a ground 214. The ground electrode 214, which is also connected to the ground 222, is arranged in opposition to the measurement electrodes 204, 206 (i.e. in opposition to the electrode roller bearings 204a, 206a). An output of the resistance measurement unit 202 is coupled to the data logger 224 which records the measured signal values at periodic, or perhaps sporadic, time intervals.

The data logger 224 is further coupled to the data analysis unit 226 which in turn is coupled to the feedback unit 228, for example, in a series connection. The data analysis unit 226 may evaluate a received signal from the resistance measurement unit 202 to determine a metric indicative of the surface resistance of the primed substrate 208. The feedback unit 228 may subsequently use this information to control the drying system (see 816 of FIG. 8) to control one or more of: airflow temperature, belt speed (where a belt controls translation of the substrate through the inline priming system), air flow rate, air flow capacity and air flow direction across the surface of the substrate. This allows a dryness profile of the primer on the primed substrate to be controlled and adapted where appropriate.

The power supply 210 acts as a current source, and conventional current flows from the first electrode 204 (connected to positive power terminal) to the second electrode 206 (connected to negative power terminal) across the surface of the primed substrate 208. The resistance measurement unit 202 measures a potential difference between the first electrode 204 and ground 214. The current flowing between the second 206 and first 204 electrodes may vary dependent on the conductivity of the primed surface of substrate 208 between the two electrodes. The surface resistance may also (or alternatively) be measured by placing an ohmmeter across the electrodes or an ammeter coupled to the first electrode 204 to measure the current flow between the first electrode 204 and ground 214. Alternatively any other kind of measurement unit indicative of surface resistance may be used.

An underside of the primed substrate 208 corresponding to an unprimed surface is also coupled to ground through the ground electrode 214 to avoid undesirably measuring the current flowing through the substrate, this coupling conducts the current passing through the substrate 208 away to ground and bypasses it from the resistance measurement unit 202.

The example apparatus may have the measurement electrodes arranged laterally across the width of the substrate so that they are perpendicular to the direction of movement of the substrate through the inline priming system, which may be the same as the direction through the print engine 820 (see FIG. 8). The example method may comprise determining moisture values based on the measured surface resistance values. The example apparatus may have a ground electrode to, in use, be in contact with the opposite, non-primed, surface of the primed substrate 208, wherein the ground electrode is aligned opposite to at least two adjacent measurement electrodes.

Figure 2B:
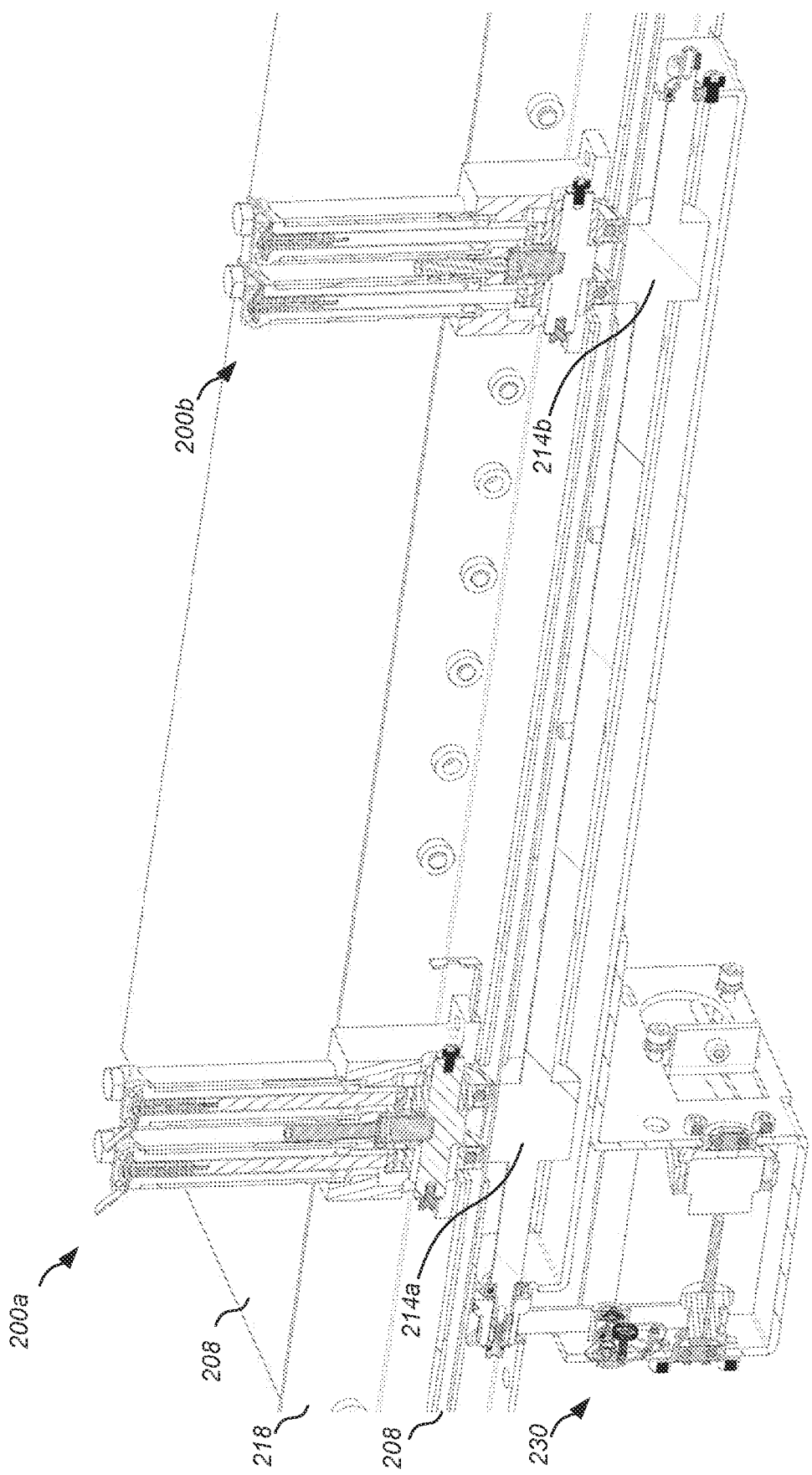
FIG. 2B shows a cutaway view of an example dryness measurement circuit but having two of the measurement electrode-pair arrangements corresponding to the single arrangement shown in in detail in the FIG. 2A example.

FIG. 2B shows a cutaway of a portion of the example dryness measurement circuit 200 of FIG. 2A looking along a direction of travel of the primed substrate 208 through the inline priming system (in use) and showing the primed substrate sandwiched in a space (of variable width) between the ground electrode 214 and a plurality of measurement electrode assemblies 200a, 200b each assembly comprising a pair of measurement electrodes. The ground electrode 214 is formed as a spindle to have two enlarged cylindrical sections 214a, 214b in opposition to the two measurement electrode assemblies 200a, 200b to form two respective "nips" therewith, the nips being relatively narrow regions of engagement (and of electrical contact) with the primed substrate 208. At these substrate-gripping regions, enlarged sections 214a, 214b of the ground electrode 214 abut the primed substrate 208 from below and the respective measurement portions of the electrode assemblies 200a, 200b abut the primed surface of the substrate from above the plane. Arranging plural measurement electrodes 200a, 200b and ground electrodes 214a, 214b in this way allows the drying measurement unit to build up a dryness profile of the primer at a plurality of different locations (points, lines or extended areas between pairs of electrodes) across the substrate.

The two electrode assemblies 200a, 200b shown in FIG. 2B are supported on a lateral support member 218 extending across at least a portion the surface of the primed substrate 208, such as across an axis perpendicular to the direction of travel of the primed substrate 208. Underneath the primed substrate 208 and also beneath the ground electrode 214, a motor 230 is illustrated. The motor 230 may be arranged to drive a rotation of the ground electrode 214 by a belt system (not shown) or other form of locomotion so as to move the substrate between the ground 214 and measurement electrodes 204, 206 perpendicular to the plane of the illustrated cross section. In alternative examples the measurement electrode assembly may be arranged to move relative to a fixed or moving printing substrate.

Figure 2C:
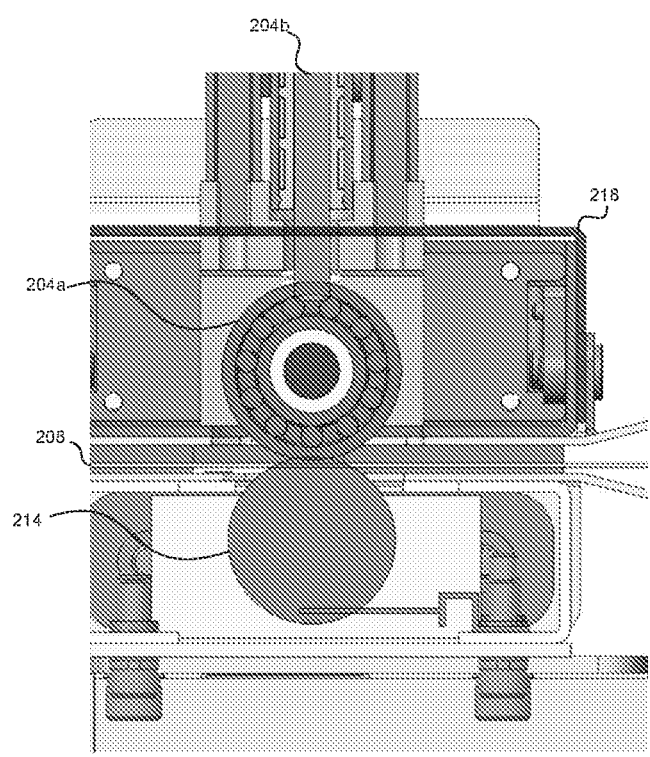
FIG. 2C shows a cross section view through a single one of the pair of measurement electrodes of the example single measurement electrode-pair arrangement shown in FIG. 2A.

FIG. 2C shows across sectional view through the first measurement electrode 204, the ground electrode 214 and the primed substrate 208, with the primed substrate being urged between the first measurement electrode 204, the ground electrode 214 to perform resistance measurements. The view illustrates the substrate 208 between and in contact with the roller bearing 204a (above) and the spindle-mounted ground electrode 214 (beneath). The spring-loaded contact rod 204b provides electrical contact between the power source 210 and the roller bearing 204a. Also shown is the electrode lateral support member 218.

Figure 3A:
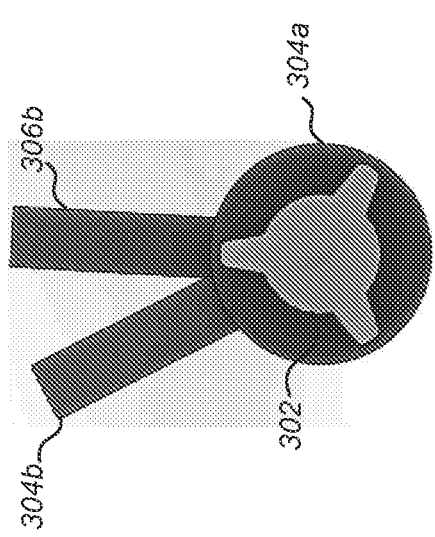
FIG. 3A shows a side view of a further example measurement electrode arrangement in which a plurality of ring-like measurement electrodes, rather than pairs of electrodes, are arranged along a roller member.
Figure 3B:
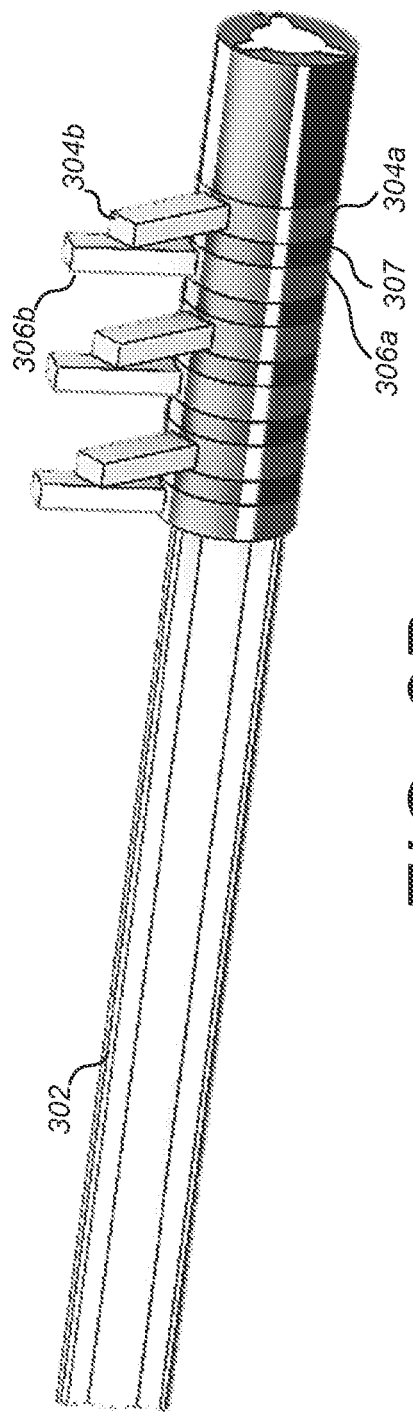
FIG. 3B shows a view from one side and above of the example measurement electrode arrangement shown in FIG. 3A.

FIGS. 3A & 3B schematically illustrate an alternative measurement electrode assembly arrangement to the arrangement of FIG. 2C. Instead of providing one or more cylindrical electrode-pair arrangements on the spindle 220 mounted in the lateral support member 218, in the FIG. 3A and FIG. 3B example, a plurality (six in this example) of spaced apart ring-like measurement electrodes 304a, 306a are provided, mounted on and distributed along a dryness measurement roller 300. The ring-like measurement electrodes 304a, 306a are alternatives to the roller bearings 204a, 206a of the arrangement of FIG. 2A. A first contact rod 304b and a second contact rod 306b are arranged to contact against the measurement electrodes 304a, 306a. The contact rods 304b, 306b may be spring loaded similarly to the counterpart first and second spring loaded contact rods 204b, 206b as illustrated in FIG. 2A and may also be provided in a similar lateral support member. Note that the first and second contact rods 304b, 306b of the FIGS. 3A and 3B examples, make contact with but are not (but could be) formed integrally with the ring-like measurement electrodes 304a, 306a.

To facilitate understanding, the roller 300 of FIG. 3B is shown in isolation from the other components of the dryness measurement circuits (e.g. the circuit 100) shown in FIGS. 1, 2A, 2B and 2C. In combination with the dryness measurement roller 300, a ground electrode (a counterpart of ground electrode 214) is to be provided to form a nip with the roller 300. That is, a narrow gap is provided between the ring-like electrodes 304a, 306a of the roller 300 and at least portion(s) of the ground electrode so that, in use, electrical contact with the primed surface is made by the ring-like electrodes 306a, 306b in the narrow gap as the primed substrate is fed through the inline priming system. The first and second contact rods 304b, 306b may be electrically connected to a measurement circuit (not shown), such as a circuit comprising the resistance measurement unit 202, the data analysis unit 226 and the feedback unit 228 of FIG. 2A, to generate and log data indicative of the surface resistance of the primed substrate at one or more locations across the surface of the substrate as it passes between and makes electrical contact with the measurement electrodes on a primed substrate surface and the ground electrode on an unprimed surface of the same substrate.

The measurement roller 300 may have a roller spindle 302, with the plurality of measurement electrodes 304a, 306a mounted on it, but spaced apart from each other by electrically insulating spacers 307. In use, the primed substrate may pass under the dryness measurement roller 300. The ring-like electrodes 304a, 306a may be formed as cylindrical walls to rotate with the spindle 302 to follow the surface of the substrate as it passes across the roller 300 as it travels through the inline primer unit. The roller spindle 302 and spacers 307 may be shaped in order to prevent the spacers 307 from rotating around the spindle 302 to keep them in a fixed position on it. The spacers 307 may have an external diameter narrower than the measurement electrodes 304a, 306a to prevent the spacers from contacting the substrate as it passes through the nip. Alternatively, the spacers 307 may have an external diameter the same as or similar to the measurement electrodes 304a, 306a and may, similarly to the electrodes, be able to freely rotate as they contact the primed substrate as it passes between the narrowing (nip) between the ground electrode and the measurement electrodes 304a, 306a (mounted on the roller 300).

The spacers 307 are formed of an electrically insulating material so as not to provide a conduction path for the current between the measurement electrodes 304a, 306a. The spring-loaded contact rods 304b, 306b are provided to enable electrical contact to be made from a power source to the rotating measurement electrodes 304a, 306b. The spring-loaded contact rods 304b, 306b make contact onto and extend away from the rotating surfaces of the measurement electrodes 304a, 306a. These spring-loaded contact rods 304b, 306b may be offset alternately with each other as illustrated to facilitate easier connection to the measurement circuitry.

Although FIG. 3B shows a partially assembled array of measurement electrodes 304a, 306a and spacers 307 along a roller spindle 302, this arrangement of electrodes and spacers may be extended along the full length of a spindle long enough to form a measurement roller across the whole, or a partial width of the substrate. Surface resistance measurements may then be made across the plurality of electrodes. For example, surface resistance may be measured pair-wise between adjacent electrodes, although any number of combinations of different electrodes on the spindle 302 may be used in order to measure surface resistance. Switching circuits may be provided to control the application and measurement of current between the different measurement electrodes 304a, 306a.

Measuring the surface resistance at multiple points across the primed substrate 108 via a plurality of spaced apart measurement electrodes allows a profile of the surface resistance of the substrate to be determined, for example, using machine-executable program instructions executing on processing circuitry of the controller 812 of FIG. 8. The dryness profile is indicative of the dryness of the primer layer at different positions and/or along different lines and/or in different areas (discrete or continuous) on the surface of the primed substrate. As the primed substrate passes between the measurement roller 300 and the opposing ground electrode (counterpart of ground electrode 214 in FIG. 2A), by using measurement data obtained via the plurality of measurement electrodes, a dryness map can be generated corresponding to the electrical contact points on the surface of the primed substrate where the surface measurements are made. This allows the dryness of a primer layer of primed substrate to be evaluated as a function of time and/or as a function of spatial position on the surface of the substrate to generate the dryness map. The controller 812 may use information from the dryness map to identify the effectiveness of a drying process being performed by the drying system 816. For example, an evenness of the drying or a rate of the drying may be evaluated using the dryness map. Localised wet patches or localised primer-free patches where a primer layer is potentially absent due to a defective coating process may be identified.

Operational parameters of the drying system may include one or more of temperature, belt speed or substrate translational speed, air flow rate, air flow capacity (e.g. based on fan speed in Hz), and air flow direction. Feedback from the dryness map may be used by the controller to adjust at least a subset of these operational parameters to improve the efficiency and/or the effectiveness of the drying process performed by the drying system 816. With regard to localising air flow on particular locations of relatively wet primer, it could be determined, for example that a strip or patch along one or both edges of the substrate contains more moisture than a central region and this could be addressed, for example, by directing fans towards the substrate edges and/or selectively increasing a speed setting of fans directed towards the substrate edges. The controller may take into account the translational speed of the substrate through the inline priming system to identify a current location of a previously detected localised wet patch. In this way, the inline priming system can operate to achieve a desired primer dryness on entry to the print engine to achieve a desired adhesion of printing liquid to the primed substrate, helping ensure a good print quality and helping to reduce the likelihood smudging of the printed substrate.

Figure 4:
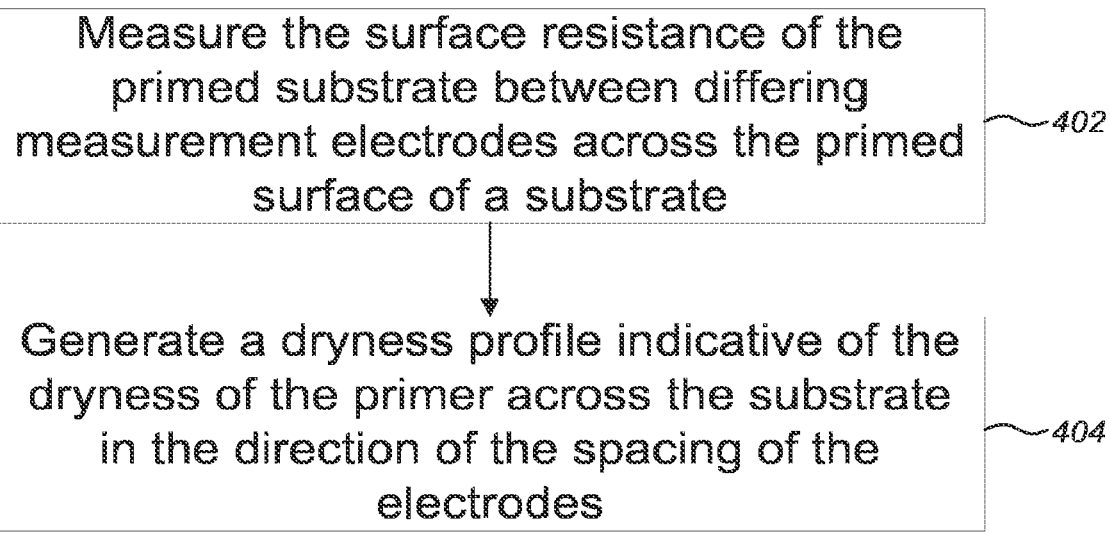
FIG. 4 shows a flow diagram illustrating an example process for measuring the dryness of a primed substrate.

FIG. 4 shows a flow diagram illustrating an example process for measuring the dryness of a primed substrate. In process element 402, the dryness of primer on a substrate in an inline priming system is measured using a plurality of measurement electrodes spaced laterally to extend across and contact a primed surface of a substrate following application of a primer to the substrate as it is fed through the inline priming system. The surface resistance of the primed substrate between different (differing) measurement electrodes across the primed surface of a substrate is measured.

In process element 404, a dryness profile is generated indicative of the dryness of the primer across the substrate in the direction of the spacing of the electrodes.

Figure 5A:
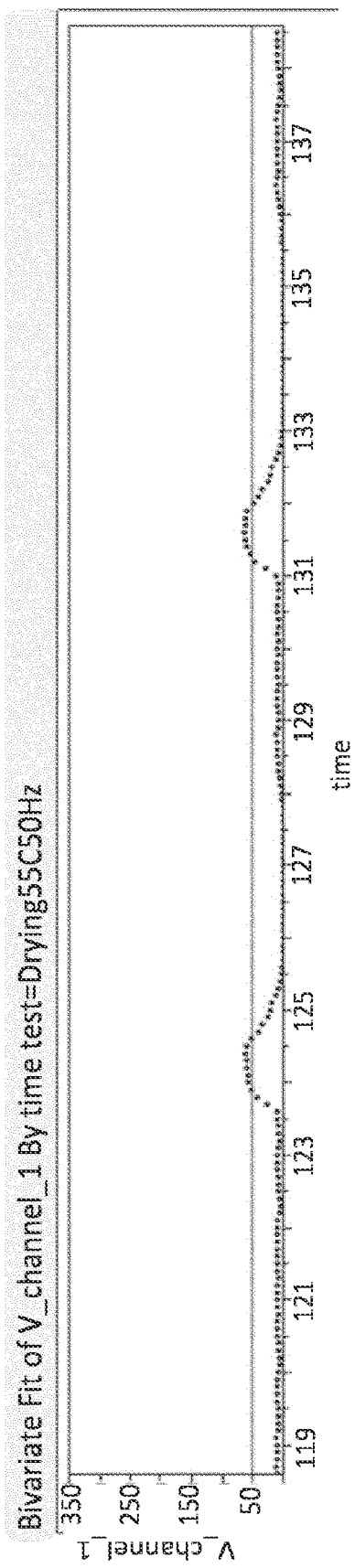
FIGS. 5A to 5E are graphs schematically illustrating a voltage indicative of surface resistance of a substrate against time for a range of different airflow rates and temperatures according to one example.
Figure 5B:
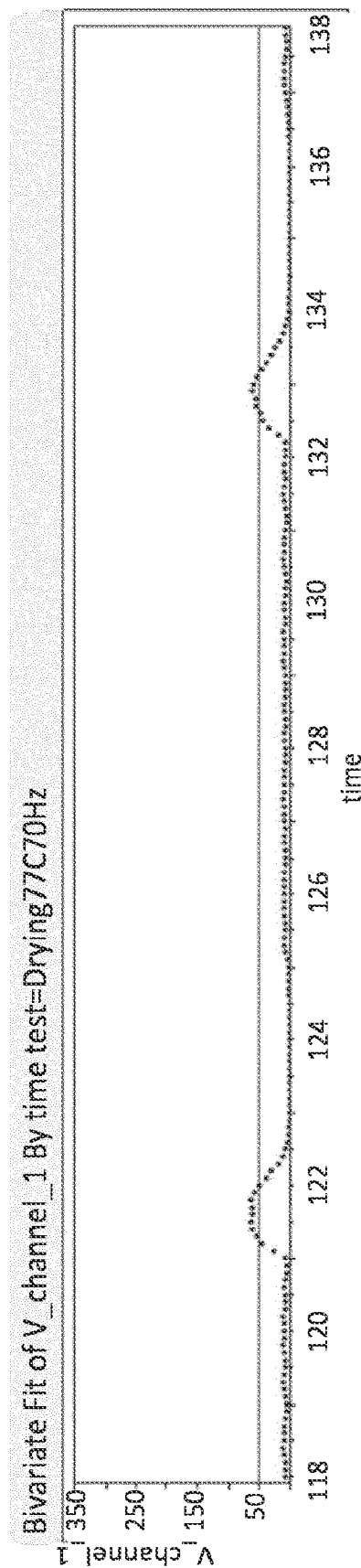
Figure 5C:
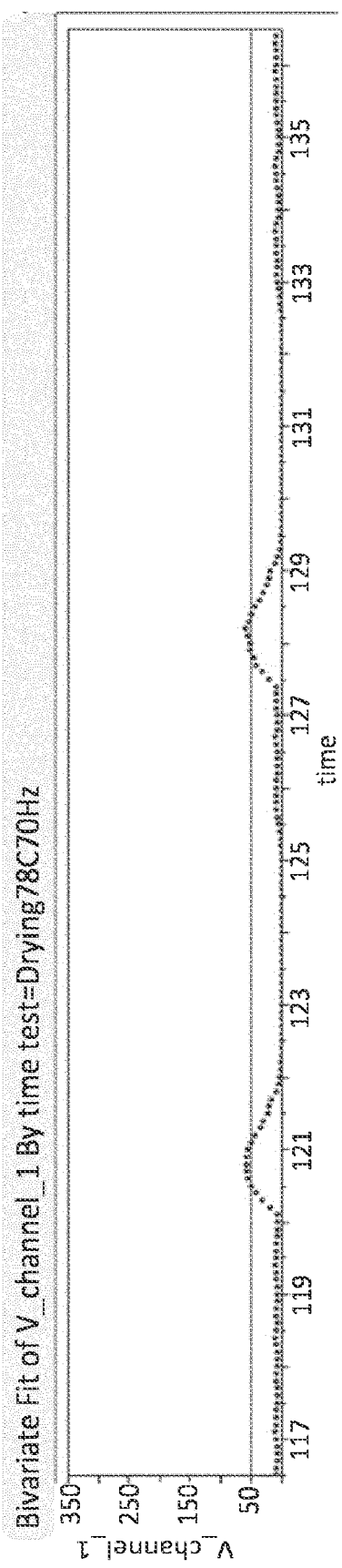
Figure 5D:
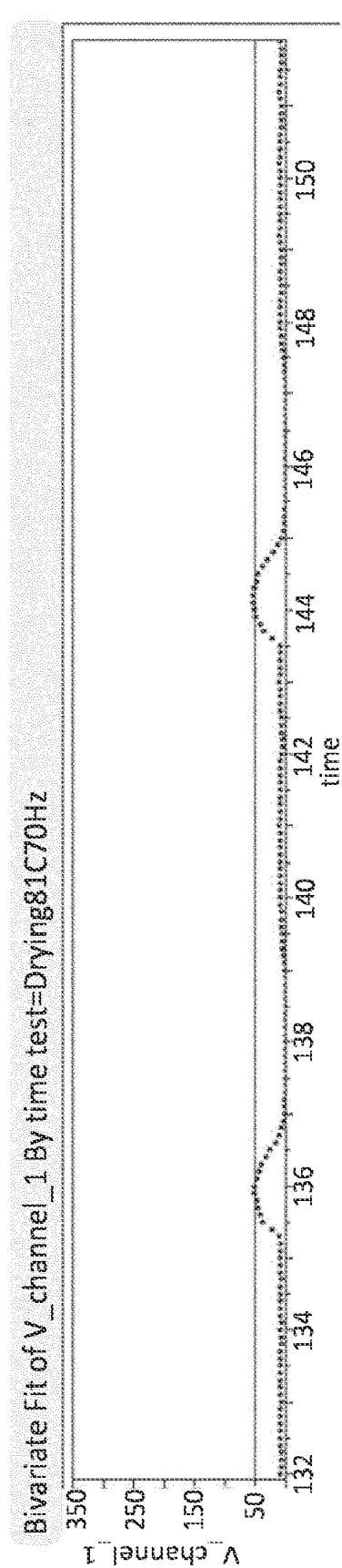
Figure 5E:
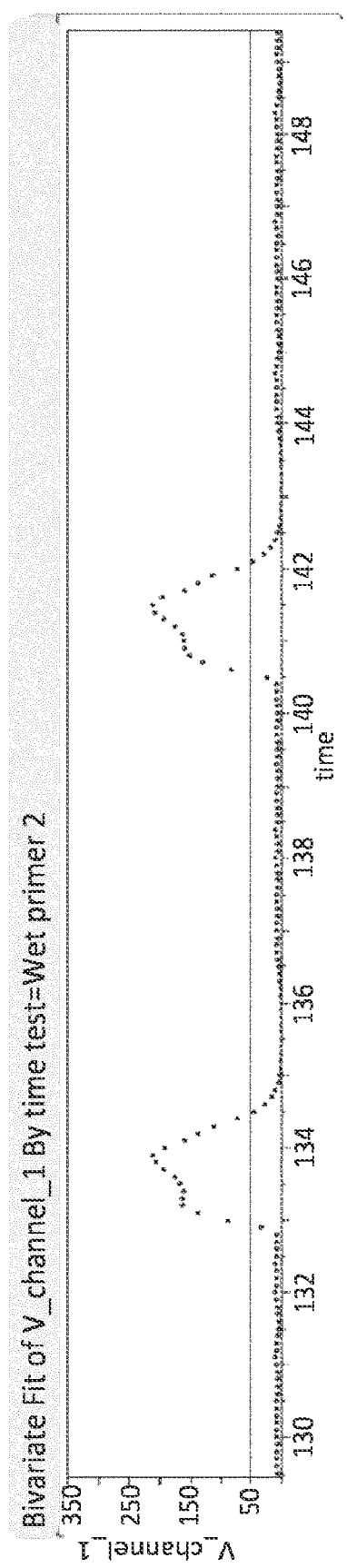

FIGS. 5A to 5E illustrates potential difference values between a first electrode and ground electrode of a substrate measured using a measurement electrode assembly 200 as shown in FIG. 2 against time in an inline priming system for primed substrates having been subjected to range of different airflow rates and temperatures in the drying system. In FOGs. 5A to 5E, a higher voltage is illustrative of a lower surface resistance, and therefore a wetter substrate. As can be seen in each of FIGS. 5A to 5E, data points are collected over time and, as two sheets of primed substrate pass underneath, 'bumps' of increased voltage in the sampled data points are seen, indicative of a lower surface resistance due to the conductivity of the drying primer. FIG. 5A illustrates the dryness of a substrate when the temperature of the air applied to the substrate is 55° C. and at an air flow rate given by a fan rotation frequency of 50 Hz. FIG. 5B illustrates the dryness of a substrate when the temperature of the air applied to the substrate is 77° C. and at a flow rate of 70 Hz. FIG. 5C illustrates the dryness of a substrate when the temperature of the air applied to the substrate is 78° C. at a flow rate of 70 Hz. FIG. 5D illustrates the dryness of a substrate when the temperature of the air applied to the substrate is 81° C. at a flow rate of 70 Hz. FIG. 5E illustrates the dryness of a primed substrate with no hot air flow applied to the surface of the substrate in which the primer is still wet.

As can be seen, the wet primer gives 'bumps' corresponding to higher voltage, and lower surface resistance. By the same token, areas of substrates in which very high resistance (lower voltage) are measured are indicative of areas of the substrate to which no or little primer has been applied. Thus the apparatus of the examples of the disclosure can be used to indicate or detect the absence of primer from primed substrate.

Figure 6:
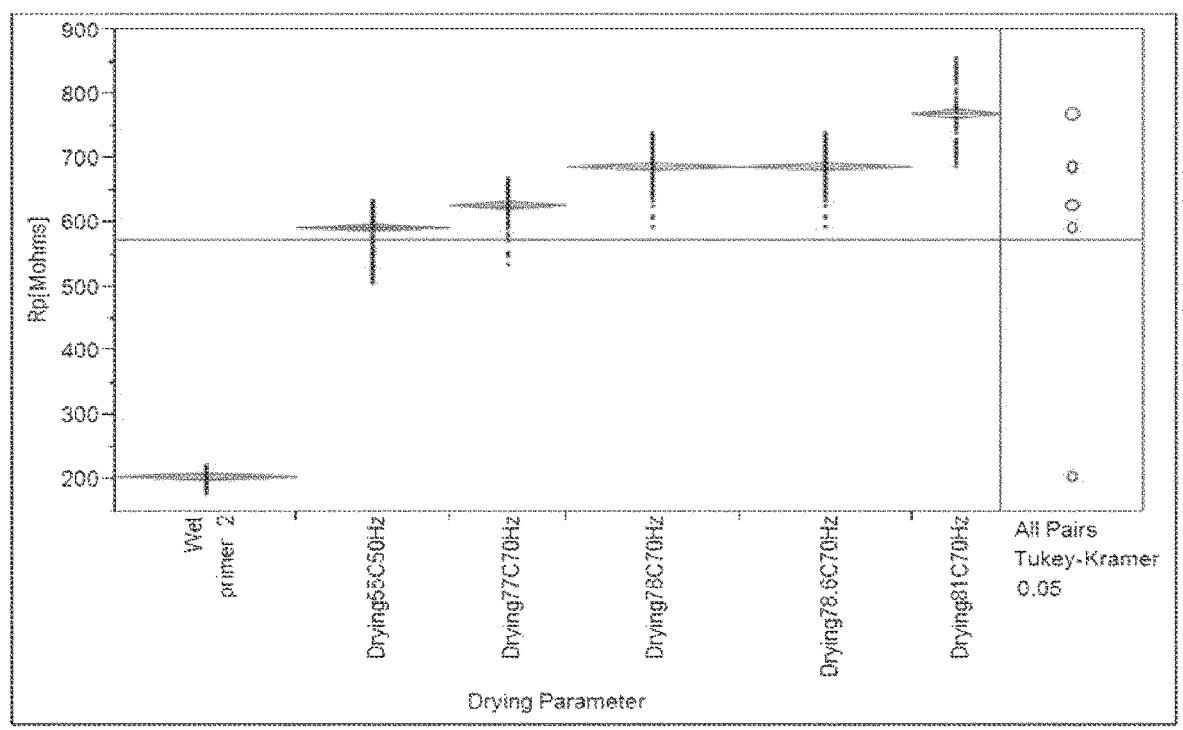
FIG. 6 schematically illustrates surface resistance values for a range of different airflow rates and temperatures according to one example.

FIG. 6 presents a chart illustrating the measured surface resistance for primed substrate having been dried by the drying system using one of a range of different airflow rates and temperatures. FIG. 6 collectively illustrates the data from FIGS. 5A to 5E and shows that the surface resistance, and therefore dryness of a primed substrate increases proportionally with the temperature and rate of flow of hot air applied to the substrate.

Figure 7A:
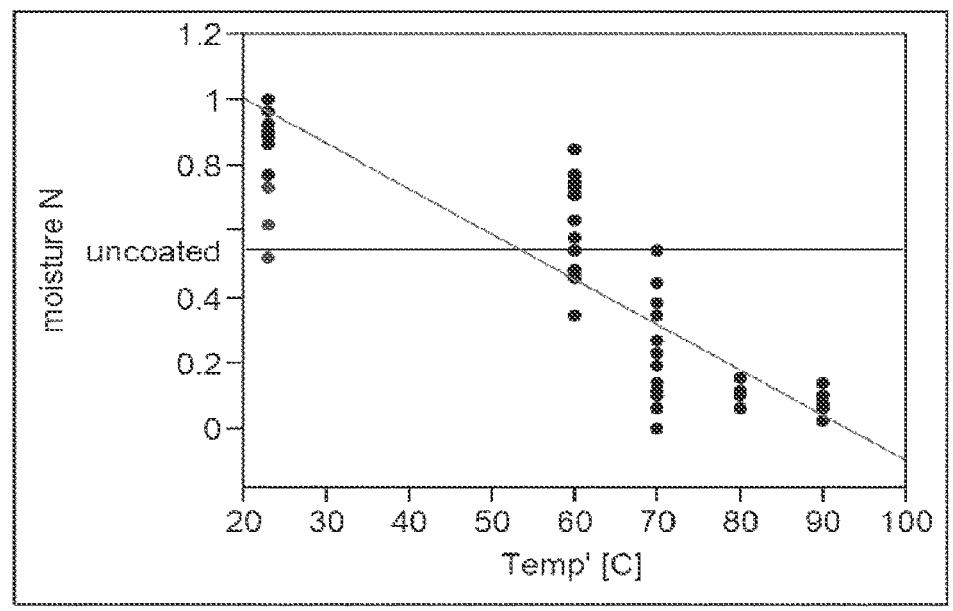
FIGS. 7A & 7B are graphs schematically illustrating empirical results for a moisture of a substrate against airflow temperatures and capacities in Hz (based on a fan rotation frequency) according to one example.
Figure 7B:
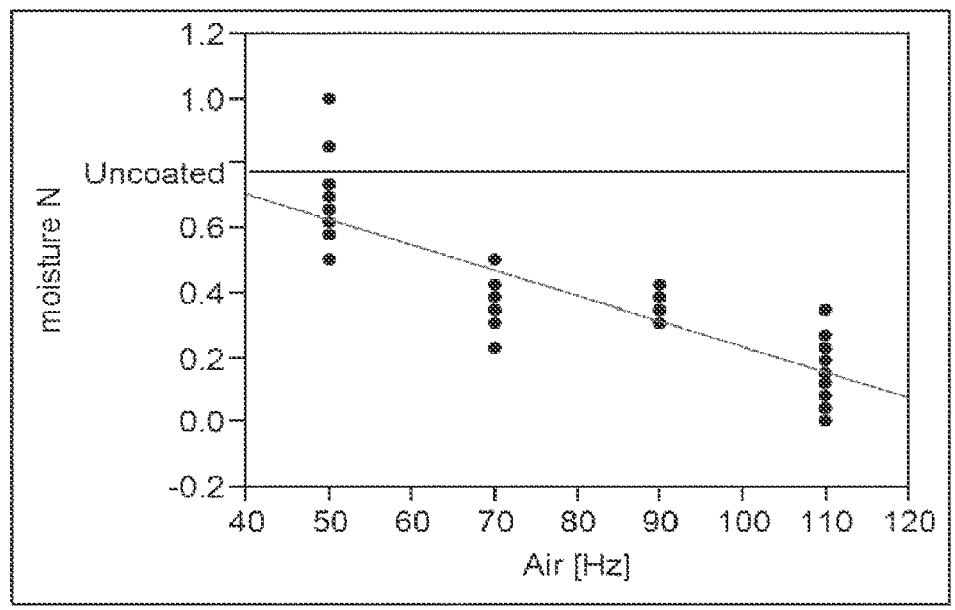

FIG. 7A is a graphs schematically illustrating a relationship between the measured moisture percentage of a substrate against airflow temperatures. FIG. 7B is a graphs schematically illustrating a relationship between the measured moisture percentage of a substrate against airflow capacity (FIG. 7B). The plotted data is based upon empirical results. FIG. 7A illustrates a moisture percentage of the substrate against the temperature of the airflow at a 50 Hz airflow capacity (i.e. rotation frequency of the fans). The trend line applied to this plot illustrates that the moisture of a primed surface of a printing substrate decreases proportionally with the temperature of the air flow applied.

FIG. 7B is a graph illustrating a moisture of the substrate against the airflow capacity at a temperature 70° C. The trend line applied to this plot illustrates that the moisture of a primed surface decreases proportionally with the air flow capacity applied in Hz. Measuring moisture content or normalised moisture content of the drying primer layer in this way can be used to calibrate and validate a measurement response of the dryness/resistance measuring circuit according to any one of the examples described herein.

The example apparatuses or methods provided may have a controller to feedback the dryness profiles to the inline priming system to adjust operational parameters of the inline priming system in response to the generated dryness profile. The operational parameters may comprise at least one or more of: temperature, belt speed, air flow rate, air flow capacity, air flow direction. The controller may generate an alert if the dryness profile indicates primer is not detected or if primer is above a moisture threshold. The controller may convolve the dryness profile as the substrate passes through the measurement electrodes to generate a map overtime of dryness.

FIG. 8 schematically illustrates a print system 800 incorporating the dryness/resistance measurement circuit according to any one of the examples described above. The print system 800 comprises an inline priming system 810 and a print engine 820. The inline priming system 800 comprises a controller 812, an inline primer unit 814, a drying system unit 816 and a dryness measurement unit 818. The controller 812 is coupled to each of the inline primer unit 814, the drying system unit 816 and the dryness measurement unit 818. The broken line in FIG. 8 indicates the direction of passage of a substrate through the components of the inline priming system 810 and the print engine 820 as part of a sequential priming and printing process.

In an example operation, the controller 812 operates the inline primer unit 814 to apply primer to the surface of a substrate inline prior to printing. Once the primer has been applied to the surface of the substrate the drying system unit 816 is operated by the controller 812 to dry the substrate. The drying system unit 816 may configure a dryer to apply air to the surface of the substrate. The drying system unit 816 may configure at least one or more of the air temperature, the air flow rate, the air flow capacity and the air flow direction. Furthermore, the drying system unit 816 may configure the speed of a belt (or other translational mechanism) which moves the substrate through the inline priming system 810 and possibly also through the print engine 820.

The dryness measurement unit 818 measures the surface resistance of the primed substrate as described above with reference to the examples. This measurement data is used to generate a dryness or moisture content profile of the substrate. The dryness profile is indicative of the dryness of the substrate at multiple different points across the surface of the primed substrate. By taking a dryness profile across the surface of the recently primed substrate over time as the substrate passes through the dryness measurement unit 818, a dryness map of the primer on the substrate after and/or during drying by the drying system unit 816 can be built up.

The dryness profile and/or dryness map data can be fed back to the controller 812 in order to adjust the configuration or operational parameters of the drying system unit 816. For example, if the dryness measurement unit 818 generates a profile indicative that the primer is still too 'wet' (i.e. too wet to promote good adhesion of ink or other printing liquid in the subsequent print process), or even too wet at particular locations on the substrate, the drying system unit 816 may increase one or more of air flow temperature, air flow rate and air flow capacity. The drying system unit 816 may also change the direction of the airflow in a targeted direction towards the 'wet' area of the substrate. The belt speed of the inline priming system 810 may be reduced to allow the substrate to spend an increased amount of time being dried by the air flow.

After the substrate has been primed and dried by the inline priming system 810, the print engine 820 proceeds to apply printing liquid to the substrate.

Processing circuitry or circuitry such as the circuitry implemented in the controller 812 and/or in the dryness measurement unit 818 of the example of FIG. 8 and/or implemented in the data logger 224, data analysis unit 226 or feedback unit of FIG. 2A may be general purpose processor circuitry configured by program code to perform specified processing functions or may be special purpose processing circuitry for implementing the corresponding function by modification to the processing hardware. Configuration of the circuitry to perform a specified function may be entirely in hardware, entirely in software or using a combination of hardware modification and software execution. Machine-readable instructions may be used to configure logic gates of general purpose or special-purpose processing circuitry to perform a processing function. Program instructions may be provided on a non-transitory medium or via a transitory medium. The transitory medium may be a transmission medium.

Processing hardware may comprise, for example, one or more processors, very large scale integration (VLSI) circuits or field programmable gate arrays, off-the-shelf semiconductors such as logic chips, transistors, or other discrete components. The processing hardware of the controller 812 and/or of the dryness measuring unit 818 may comprise a storage medium readable by the processor, including volatile and non-volatile memory and/or storage elements. The volatile and non-volatile memory and/or storage elements may be a random access memory (RAM), erasable programmable read-only memory (EPROM), flash drive, optical drive, magnetic hard drive, or other medium for storing electronic data.

Program code or machine-readable program instructions for performing the dryness measurement based on surface resistance may be implemented in a high level procedural or object-oriented programming language. However, the code may be implemented in assembly or machine language, if desired. In any case, the language may be a compiled or interpreted language, and combined with hardware implementation.

Features, integers or characteristics described in conjunction with a particular example are to be understood to be applicable to any example described herein unless incompatible therewith. All of the features disclosed in this specification (including any accompanying claims, abstract and drawings), and/or all of the process elements of any method or process so disclosed, may be combined in any combination, except combinations where at least some of such features and/or process elements are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the elements of any method or process so disclosed.

Throughout the description and claims of this specification, the words "comprise" and "contain" and variations of them mean "including but not limited to", and they are not intended to (and do not) exclude other moieties, components, integers or process elements. Throughout the description and claims of this specification, the singular encompasses the plural unless the context otherwise. In particular, where the indefinite article is used, the specification contemplates plurality as well as singularity, unless the context suggests otherwise.

The invention claimed is:

1. An apparatus for measuring dryness of an applied liquid on a substrate in a printing system, the apparatus comprising:
 a pair of electrodes spaced laterally to contact different portions of a surface of the substrate, each electrode comprising a roller to roll with respect to the surface of the substrate;
 a resistance measurement unit to measure a surface resistance between the pair of electrodes; and
 a controller to receive the measured surface resistance and output a dryness profile indicative of a dryness of the liquid on the surface of the substrate.

2. An apparatus for measuring dryness of an applied liquid on a substrate in a printing system, the apparatus comprising:
 a pair of electrodes spaced laterally to contact different portions of a surface of the substrate;
 a resistance measurement unit to measure a surface resistance between the pair of electrodes;

a controller to receive the measured surface resistance and output a dryness profile indicative of a dryness of the liquid on the surface of the substrate; and a ground electrode located on an opposite side of the substrate from the pair of electrodes to prevent the resistance measurement unit from measuring resistance of the substrate as opposed to surface resistance at the surface of the substrate on which the applied liquid is drying.

3. The apparatus of claim 2, wherein the ground electrode comprises a roller, and the apparatus further comprises a motor to drive rotation of the ground electrode to move the substrate between the pair of electrodes and the ground electrode.

4. The apparatus of claim 1, further comprising a feedback loop comprising:
the controller; and
a drying system comprising a fan;
wherein the controller is to control the fan based on the dryness profile.

5. The apparatus of claim 4, wherein the fan is to produce a heated airflow, the controller to control an airflow temperature from the fan based on the dryness profile.

6. The apparatus of claim 1, further comprising a belt for moving the substrate relative to the pair of electrodes, the controller to control a belt speed of the belt based on the dryness profile.

7. The apparatus of claim 1, wherein the controller is to output operational parameters for the printing system based on the dryness profile, the operational parameters comprising one of: temperature, belt speed, airflow rate, airflow capacity and airflow direction.

8. A method for measuring dryness of an applied liquid on a substrate in a printing system, the method comprising:
after application of the liquid to the substrate, measuring a surface resistance of the substrate bearing the liquid, the surface resistance being measured between a pair of electrodes spaced laterally to contact different portions of a surface of the substrate;
with a controller to receive the measured surface resistance, outputting a dryness profile indicative of a dryness of the liquid on the surface of the substrate; and
controlling a speed of the substrate moving with respect to the pair of electrodes based on the dryness profile.

9. The method of claim 8, wherein the applied liquid is a primer.

10. The method of claim 8, further comprising controlling operational parameters of the printing system based on the dryness profile.

11. The method of claim 10, further comprising controlling application of an airflow to the substrate based on the dryness profile.

12. The method of claim 11, further comprising controlling heating of the airflow based on the dryness profile.

13. The method of claim 8, further comprising grounding the substrate with a ground electrode located on an opposite side of the substrate from the pair of electrodes to prevent measuring resistance into the substrate as opposed to surface resistance.

14. The method of claim 13, wherein the ground electrode comprises a roller; and the method further comprising driving rotation of the ground electrode to move the substrate between the pair of electrodes and the ground electrode.

15. An apparatus for measuring dryness of, and drying, an applied liquid on a substrate in a printing system, the apparatus comprising:
a resistance measurement unit to measure a surface resistance at the applied liquid that is drying on a surface of the substrate;
a controller to receive the measured surface resistance and output a dryness profile indicative of a dryness of the liquid on the surface of the substrate; and
a drying system to dry the liquid on the surface of the substrate, the controller to adjust operational parameters of the drying system based on the dryness profile;
wherein the resistance measurement unit comprises an array of multiple electrodes between pairs of which the surface resistance is measured by the resistance measurement unit.

16. The apparatus of claim 15, further comprising a ground electrode located on an opposite side of the substrate from the array of electrodes to prevent the resistance measurement unit from measuring resistance into the substrate as opposed to surface resistance at the surface of the substrate on which the applied liquid is drying.

17. The apparatus of claim 15, wherein the ground electrode comprises a roller, and the apparatus further comprises a motor to drive rotation of the ground electrode to move the substrate between the array of electrodes and the ground electrode.

18. The apparatus of claim 15, wherein the operational parameter is one of: temperature, belt speed, airflow rate, airflow capacity and airflow direction.

19. The apparatus of claim 15, wherein the array of multiple electrodes is arranged on a pair of rollers.

20. The apparatus of claim 2, wherein the controller is to control a fan or a speed of the substrate based on the dryness profile.

* * * * *